United States Patent
Prusinowski (10) Patent No.: US 9,821,849 B2
(45) Date of Patent: Nov. 21, 2017

(54) WHEEL ALIGNMENT AND TOE ANGLE ADJUSTMENT SYSTEM FOR A THREE-WHEELED VEHICLE

(71) Applicants: Bosch Automotive Service Solutions LLC, Warren, MI (US); Robert Bosch GmbH, Stuttgart (DE)

(72) Inventor: Andrew Prusinowski, Royal Oak, MI (US)

(73) Assignees: Bosch Automotive Service Solutions LLC, Warren, MI (US); Robert Bosch GmbH, Stuttgart (DE)

( * ) Notice: Subject to any disclaimer, the term of this patent is extended or adjusted under 35 U.S.C. 154(b) by 46 days.

(21) Appl. No.: 14/959,127

(22) Filed: Dec. 4, 2015

(65) Prior Publication Data

US 2017/0158241 A1   Jun. 8, 2017

(51) Int. Cl.
| | |
|---|---|
| B62D 17/00 | (2006.01) |
| B62K 5/05 | (2013.01) |
| G02B 27/02 | (2006.01) |
| G01B 11/275 | (2006.01) |

(52) U.S. Cl.
CPC ............ B62D 17/00 (2013.01); B62K 5/05 (2013.01); G01B 11/275 (2013.01); G02B 27/024 (2013.01); G01B 2210/10 (2013.01)

(58) Field of Classification Search
CPC ........ B62D 17/00; B62K 5/05; G01B 11/275; G01B 2210/10; G02B 27/024
See application file for complete search history.

(56) References Cited

U.S. PATENT DOCUMENTS

| | | | | |
|---|---|---|---|---|
| 4,097,157 A | * | 6/1978 | Lill ..................... | G01B 11/2755 33/288 |
| 4,150,897 A | * | 4/1979 | Roberts, Jr. .......... | G01B 11/275 250/237 G |
| 4,319,838 A | * | 3/1982 | Grossman .......... | G01B 11/2755 33/288 |
| 4,349,965 A | * | 9/1982 | Alsina .................. | G01B 11/275 33/203 |

(Continued)

OTHER PUBLICATIONS

True Laser Track, True Laser Track (TLT) Pricing, www.truelasertrack.com/pricing_home.htm, Retrieved Dec. 4, 2015, available at least as early as Oct. 9, 2015. True Laser Track, Edgewater, FL.

(Continued)

Primary Examiner — Darlene P Condra
(74) Attorney, Agent, or Firm — Maginot Moore & Beck LLP (57) ABSTRACT

A wheel alignment system for a three-wheeled vehicle comprises a reflecting assembly and a first laser emitting assembly. The reflecting assembly includes a first mirror having a first reflective surface arranged in a first mirror plane that is perpendicular to a rear wheel vertical plane, which is defined centrally through a rear wheel along a direction of travel of the vehicle. The first laser emitting assembly includes a first laser emitter configured to emit a first laser light at the reflective surface along a laser line parallel to a first front wheel vertical plane, which is defined centrally through a first front wheel, and first indicia corresponding to a toe angle of the first front wheel. The first the mirror reflects the first laser light toward the first indicia.

16 Claims, 4 Drawing Sheets

(56) References Cited

U.S. PATENT DOCUMENTS

| | | | | | |
|---|---|---|---|---|---|
| 4,827,623 | A | * | 5/1989 | Goodell | G01B 11/275 33/203.18 |
| 5,815,257 | A | * | 9/1998 | Haas | G01B 11/275 356/139 |
| 6,522,400 | B1 | * | 2/2003 | Horn | G01B 11/275 356/138 |
| 6,823,598 | B1 | | 11/2004 | Loescher | |
| 8,480,099 | B2 | | 7/2013 | Porta et al. | |
| 2008/0007016 | A1 | * | 1/2008 | Hoenke | G01B 11/2755 280/5.52 |
| 2013/0110314 | A1 | * | 5/2013 | Stieff | G01B 11/275 701/1 |

OTHER PUBLICATIONS

Spyder Comfort, Spyder Laser Alignment, www.spydercomfort.com/alignment.htm, Retrieved Dec. 4, 2015, available at least as early as Oct. 9, 2015.

\* cited by examiner

WHEEL ALIGNMENT AND TOE ANGLE ADJUSTMENT SYSTEM FOR A THREE-WHEELED VEHICLE

TECHNICAL FIELD

This disclosure relates generally to vehicle maintenance tools, and more particularly to wheel alignment tools for vehicles.

BACKGROUND

Aligning vehicle wheels within specific tolerances is important for optimal control of the vehicle and for consistent wear of the tires. Alignment is performed primarily by adjusting camber, caster, toe, and steering axis inclination of the wheels.

The toe angle of a vehicle is the angle of the centerline of a front wheel relative to the longitudinal centerline of the vehicle when viewed from above. In three-wheeled vehicles having two front wheels, the toe angle of both wheels must be determined relative to the single rear wheel. This ensures the vehicle tracks correctly relative to the drive wheel, and demonstrates stable ride characteristics. The toe setting of the wheels, in particular, must be measured and aligned in order to ensure proper driving characteristics, improve fuel efficiency, and reduce tire wear.

In particular, proper toe angle relative to vehicle specifications ensures directional stability. In passenger vehicles, for example, the toe angle setting is used to maintain straight-line stability of the vehicle and enable the vehicle to resist road inputs such as bumps, potholes, and the like. In the extreme cases, a vehicle that has improper toe settings may steer the vehicle at an angle offset from the direction the driven wheel(s) point, a condition known as "dogtracking."

In four wheel vehicle alignment systems, the vehicle is typically driven onto a hydraulic lift and elevated. Target elements are attached to the vehicle wheels, and an external fixed sensor system detects the position and orientation of the target elements. The technician then adjusts the toe angle of the front wheels based on the sensed position of the wheels. However, since the rear wheel in a three-wheeled vehicle is centered behind the body of the vehicle, the rear wheel is typically obscured from view of the sensor system. When doing a four wheel alignment, the purpose is to ensure proper thrust angle and align each front wheel directly in front of the corresponding rear wheel. In a three wheeled vehicle, however, it is not possible to align the front wheels directly in front of the corresponding rear wheel since there is only a single rear wheel. Additionally, sensor based toe alignment systems are very expensive.

One solution to aligning three-wheeled vehicles involves attaching a laser to the front wheels and pointing the laser at targets positioned around the vehicle. The targets are set on the ground, and manually arranged so as to be positioned relative to the front and rear wheels. Based on the relative positions of the laser on the targets, the technician aligns the vehicle to bring the alignment settings within the specifications.

This solution requires substantial time for the technician to place and precisely measure the positions of the targets. Since vehicle toe angles are measured to very small tolerances, even a minute misalignment of the target results in the toe angle being improperly aligned. Thus, the manual setting of the toe angle targets has very low precision and substantial potential for user error. In addition to error on individual settings, this solution suffers from reduced repeatability from measurement to measurement, even when performed by the same technician.

What is needed, therefore, is a wheel alignment system for a three-wheeled vehicle that enables precise determination and alignment of the toe angle of the front wheels with respect to the rear wheels with limited potential for user error.

SUMMARY

In one embodiment, a wheel alignment system for a three-wheeled vehicle comprises a reflecting assembly and a first laser emitting assembly. The reflecting assembly includes a first mirror having a first reflective surface arranged in a first mirror plane that is perpendicular to a rear wheel vertical plane, which is defined centrally through a rear wheel along a direction of travel of the vehicle. The first laser emitting assembly includes a first laser emitter configured to emit a first laser light at the reflective surface along a laser line parallel to a first front wheel vertical plane, which is defined centrally through a first front wheel, and first indicia corresponding to a toe angle of the first front wheel. The first mirror reflects the first laser light toward the first indicia.

In another embodiment of the wheel alignment system, the first laser emitting assembly includes a plate on which the first indicia are marked, and the plate is arranged normal to the first laser line and defines an opening through which the first laser light passes.

In a further embodiment, the wheel alignment system includes a wheel hub adapter configured to attach to the first front wheel and support the first laser emitting assembly In yet another embodiment, the reflecting assembly includes a bar having a bar central axis. The bar is mounted such that the bar central axis is normal to the rear wheel vertical plane and parallel to the first mirror plane, and the bar supports the first mirror in the first mirror plane.

In one embodiment of the wheel alignment system, the reflecting assembly includes a second mirror supported by the bar and having a second reflective surface arranged in a second mirror plane that is perpendicular to the rear wheel vertical plane. The wheel alignment system further comprises a second laser emitting assembly including a second laser emitter configured to emit a second laser light at the second reflective surface along a second laser line parallel to a second front wheel vertical plane, which is defined centrally through a second front wheel, and second indicia corresponding to a second toe angle of the second front wheel. The second mirror reflects the second laser light toward the second indicia.

In some embodiments, the bar extends through and is supported by a central opening of a hub of the rear wheel.

In another embodiment, the first indicia include markings corresponding to the toe angle of the first front wheel in degrees. In a further embodiment, the first indicia include distance measurements that are converted to the toe angle of the first front wheel.

Another embodiment discloses a method of determining toe angle of wheels of a three-wheeled vehicle. The method includes mounting a reflecting assembly to a rear wheel of the vehicle in such a way that a first reflective surface of a first mirror of the reflecting assembly is arranged in a first mirror plane that is perpendicular to a rear wheel vertical plane, which is defined centrally through a rear wheel along a direction of travel of the vehicle. The method further comprises mounting a first laser emitting assembly to a first front wheel of the vehicle such that a first laser emitter of the first laser emitting assembly is directed at the first reflective surface, emitting a first laser light at the first reflective surface along a first laser line that is parallel to a first front wheel vertical plane, which is defined centrally through a first front wheel, reflecting the first laser light from the first reflective surface toward first indicia of the first laser emitting assembly, and determining a toe angle of the first front wheel based on a position of the first laser light with reference to the first indicia.

In another embodiment of the method, the emitting of the first laser light includes emitting the first laser light through an opening in a plate, which is arranged normal to the first laser line, and the reflecting of the first laser light includes reflecting the laser light onto the plate, on which the first indicia are marked.

In one particular embodiment, the mounting of the first laser emitting assembly includes mounting a wheel hub adapter on the first front wheel and supporting the first laser emitting assembly with the wheel hub adapter.

In another embodiment of the method, the mounting of the reflecting assembly comprises mounting a bar such that a bar central axis is normal to the rear wheel vertical plane and parallel to the first mirror plane and supporting the first mirror in the first mirror plane with the bar.

Another embodiment of the method further comprises the mounting of the reflecting assembly including aligning a second reflective surface of a second mirror of the reflecting assembly in a second mirror plane that is perpendicular to the rear wheel vertical plane, mounting a second laser emitting assembly to a second front wheel of the vehicle in such a way that a second laser emitter of the second laser emitting assembly is directed at the second mirror, and emitting a second laser light at the second reflective surface along a second laser line that is parallel to a second front wheel vertical plane, which is defined centrally through a second front wheel. The method also includes reflecting the second laser light from the second reflective surface toward second indicia of the second laser emitting assembly and determining a toe angle of the second front wheel based on a position of the second laser light with reference to the second indicia.

In some embodiments, the mounting of the bar includes supporting the bar through a central opening of a hub of the rear wheel bar.

In one embodiment, the method further comprises adjusting the first toe angle of the first front wheel based on the position of the first laser light with reference to the first indicia.

In another embodiment of the method, the first indicia include degree measurements corresponding to the toe angle of the first front wheel. In other embodiments, the first indicia include distance measurements that are converted to the toe angle of the first front wheel.

Another method according to the disclosure for aligning wheels of a three-wheeled vehicle, comprises mounting a reflecting assembly to a rear wheel of the vehicle in such a way that a reflective surface of a mirror of the reflecting assembly is arranged in a mirror plane that is perpendicular to a rear wheel vertical plane, which is defined centrally through a rear wheel along a direction of travel of the vehicle, and mounting a laser emitting assembly to a front wheel of the vehicle such that a laser emitter of the laser emitting assembly is directed at the mirror. The method further includes emitting a laser light at the reflective surface along a laser line parallel to a front wheel vertical plane, which is defined centrally through the front wheel, reflecting the laser light from the reflective surface toward indicia of the laser emitting assembly, and adjusting a toe angle of the front wheel based on a position of the laser light with reference to the indicia.

In one particular embodiment, the indicia include a target marking.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one of ordinary skill in the art to which this document pertains.

Figure 1:
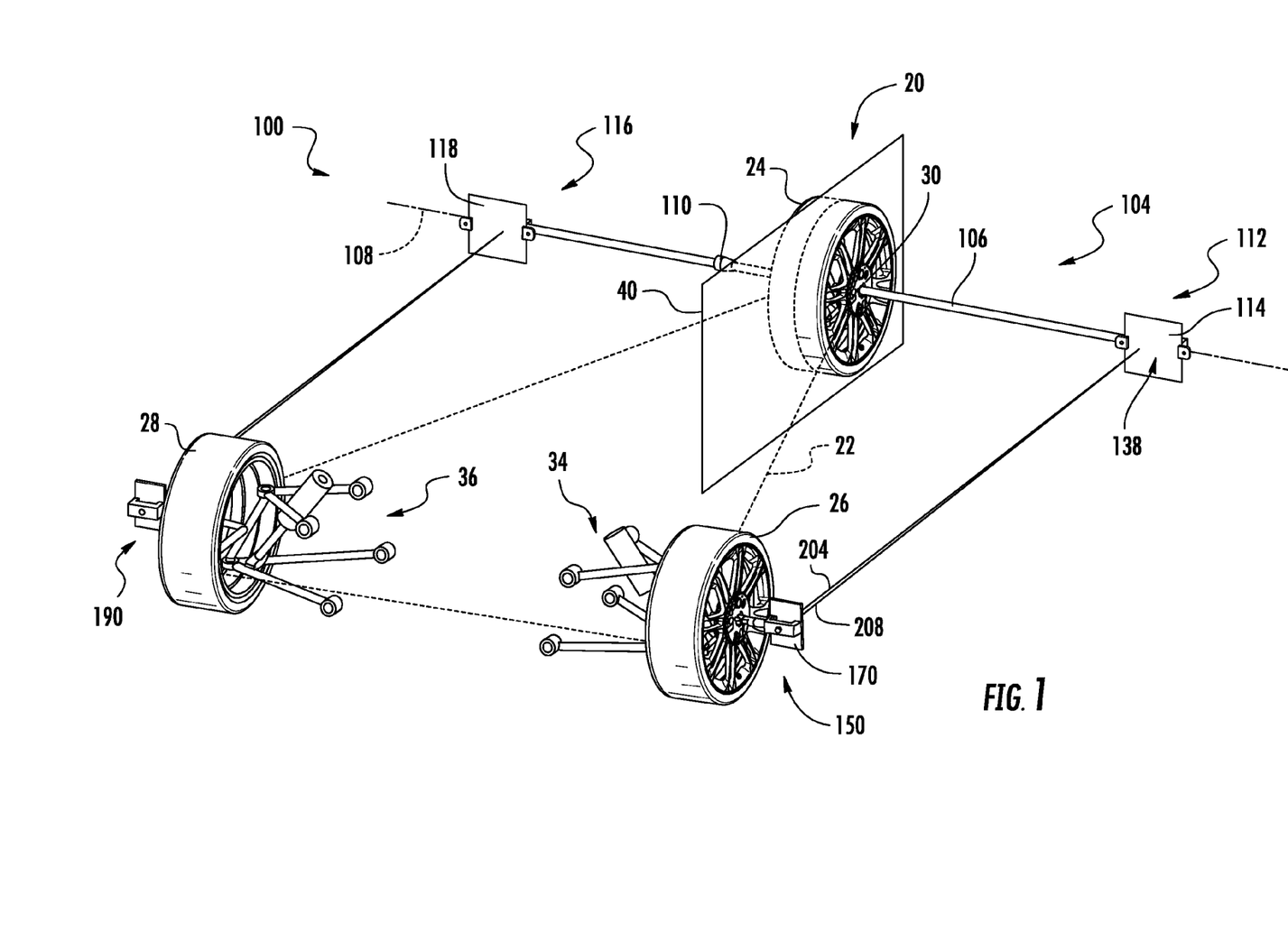
FIG. 1 is a perspective view of a vehicle, with the vehicle body not shown, and a wheel alignment system attached to the wheels of the vehicle.

A wheel alignment system 100 is illustrated in FIG. 1 mounted to wheels 24, 26, 28 of a three-wheeled vehicle 20 (the body 22 of the vehicle is only shown in shadow for clarity). The alignment system 100 includes a reflecting assembly 104, a first laser emitting assembly 150, and a second laser emitting assembly 190.

The reflecting assembly 104 includes a bar 106 that extends centrally through an opening (not shown) in the center of the rear wheel hub 30 of the rear wheel 24. The central axis 108 of the bar 106 extends normal to a plane (illustrated, for example, by plane 40) extending vertically through the center of the rear wheel 24. In some embodiments, the bar 106 is affixed to the lugnuts of the wheel. In other embodiments the bar 106 includes a cone that wedges into the opening, while in further embodiments another suitable device is used to connect the bar to the rear wheel 24. In some embodiments, the bar 106 is a telescoping bar, and has an adjusting cone 110 that enables the bar 106 to be extended or shortened to position the bar 106 at the desired position relative to the rear wheel 24.

A first mirror assembly 112 having a first mirror 114 is supported at one end of the bar 106, while a second mirror assembly 116 having a second mirror 118 is supported at the other end of the bar 106. The first mirror assembly 112 is illustrated in detail in the view of FIG. 2. While only the first mirror assembly 112 is described in detail herein, the reader should appreciate that the second mirror assembly 116 is substantially identical to the first mirror assembly 112.

Figure 2:
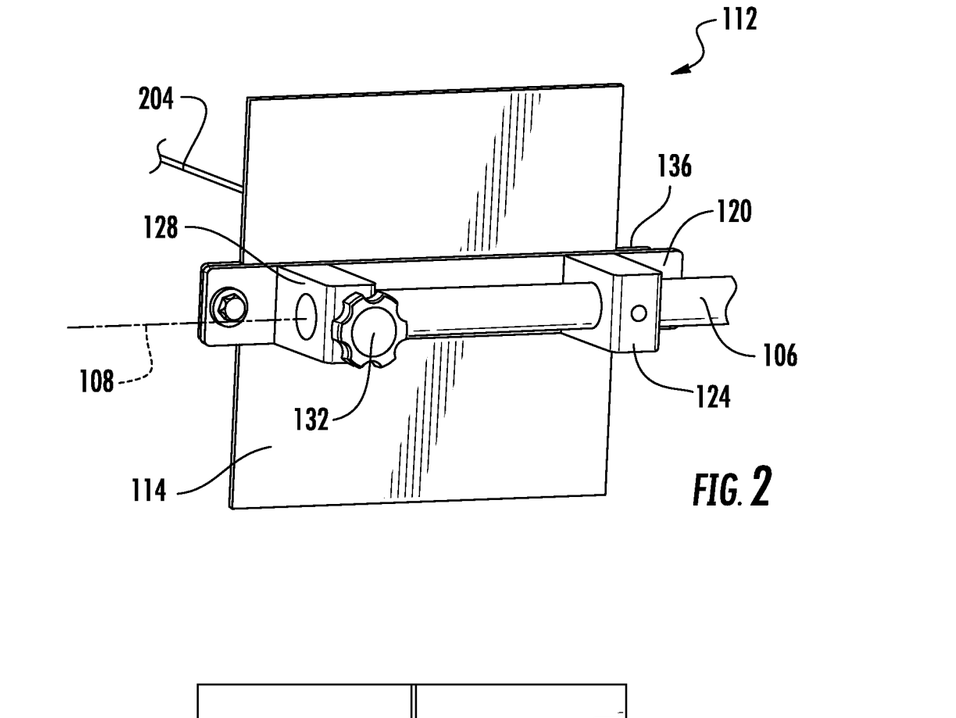
FIG. 2 is a rear perspective view of a mirror assembly of a reflecting assembly of the wheel alignment system of FIG. 1.

As shown in FIG. 2, the first mirror assembly 112 includes a holding plate 120 having two connecting portions 124, 128. Each connecting portion includes an opening through which the bar 106 slides when the mirror 114 is mounted to the bar 106. In the illustrated embodiment, a manually operated screw, or thumbscrew, 132 is threaded into an opening to fixedly clamp the bar 106 in each of the connecting portions (only one of the thumbscrews 132 is shown in FIG. 2). However, in other embodiments, the bar 106 is fastened to the connecting portions 124, 128 with another desired fastener.

The holding plate 120 further includes two clamping portions 136 (only one is visible in the view of FIG. 2) configured to clamp the mirror 114 to the holding plate 120 and retain the mirror 114 at a fixed position relative to the holding plate 120. The holding plate 120 fixes the mirror 114 such that the flat surface 138 (FIG. 1) of the mirror 114 defines a plane that is parallel to a central axis 108 of the bar 106. Since the central axis 108 of the bar 106 is normal to the vertical plane 40 extending centrally through the rear wheel 24, the plane of the flat surface 138 of the mirror 114 is orthogonal to the vertical plane 40 (FIG. 5) extending centrally through the rear wheel 24.

Figure 3:
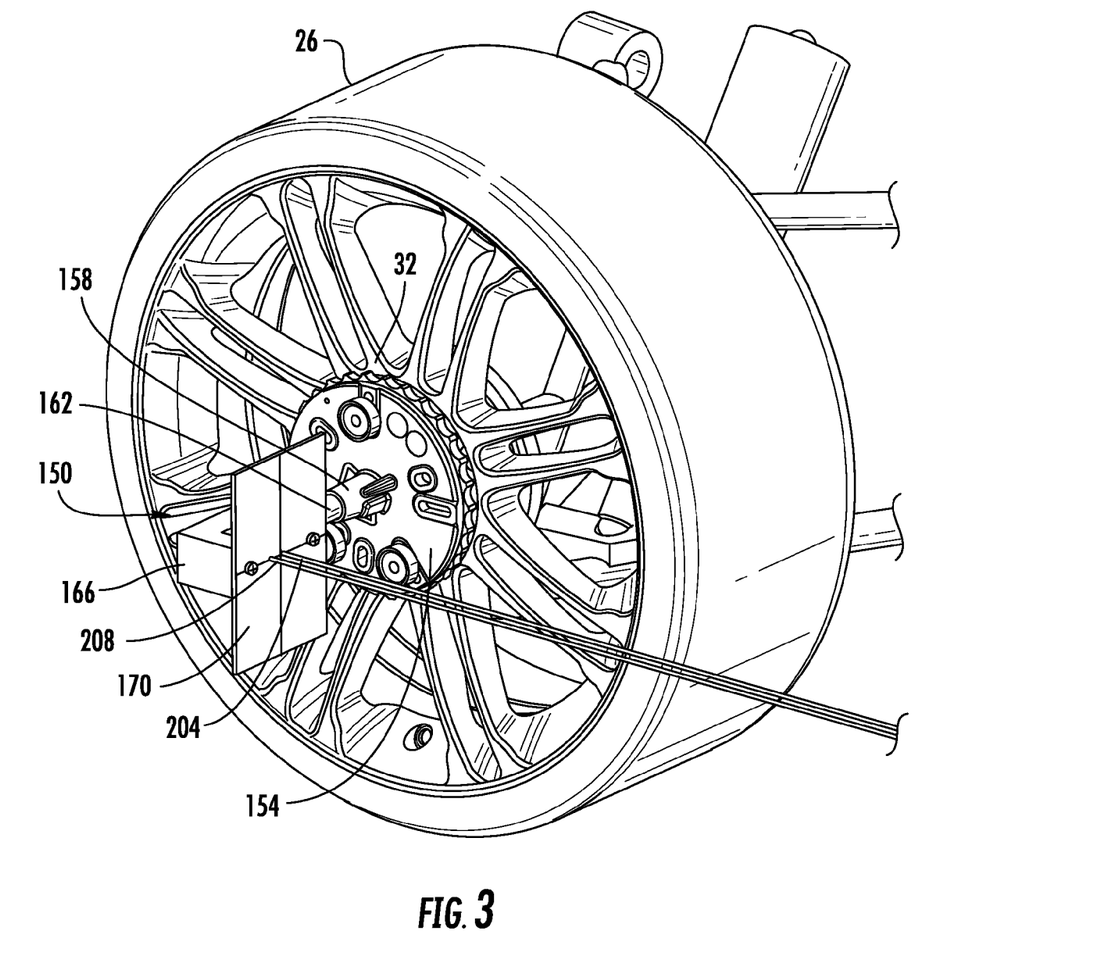
FIG. 3 is a side perspective view of a laser emitting assembly of the wheel alignment system of FIG. 1 attached to a front wheel.
Figure 4:
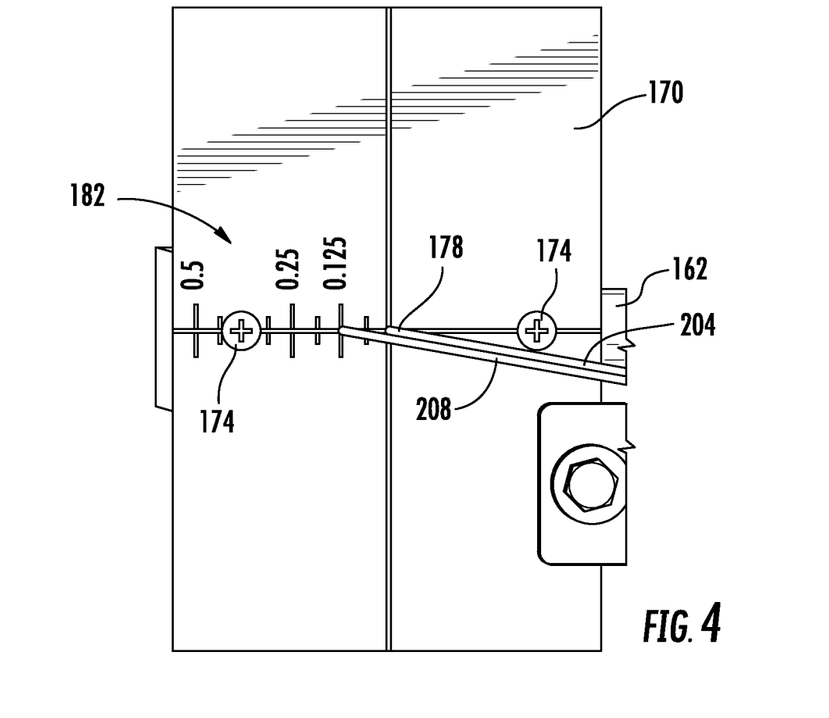
FIG. 4 is a front elevational view of the laser emitting assembly of the wheel alignment system of FIG. 1.

FIG. 3 illustrates a perspective view of the left side laser emitting assembly 150, while FIG. 4 illustrates a front view of the left side laser emitting assembly 150. A wheel hub adapter 154 mounts the laser emitting assembly 150 to the hub 32 of the wheel 26. In the illustrated embodiment, the wheel hub adapter 154 is configured to attach to the wheel hub 32 using adapters that are threaded onto the lug studs (not shown). The hub adapter 154 includes a cylindrical projecting portion 158 having a central axis that is perpendicular to the vertical plane 44 (illustrated in FIG. 5) defined centrally through the wheel 26 and hub 32.

Referring back to FIGS. 3 and 4, the laser emitting assembly 150 includes a connecting rod portion 162 that extends into the cylindrical projecting portion 158 of the hub adapter 154 to mount the laser emitting assembly 150 in the hub adapter 154. In some embodiments, the connecting rod portion 162 and the cylindrical projecting portion 158 are fixed together by, for example, a set screw or a thumbscrew (not shown). In the illustrated embodiment, the connecting rod portion 162 is mounted such that the central axis of the connecting rod portion 162 is coaxial with the central axis of the cylindrical portion 158 of the hub adapter so that the connecting rod portion 162 is also aligned normal to the vertical plane 44 (FIG. 5) extending centrally through the wheel.

Figure 5:
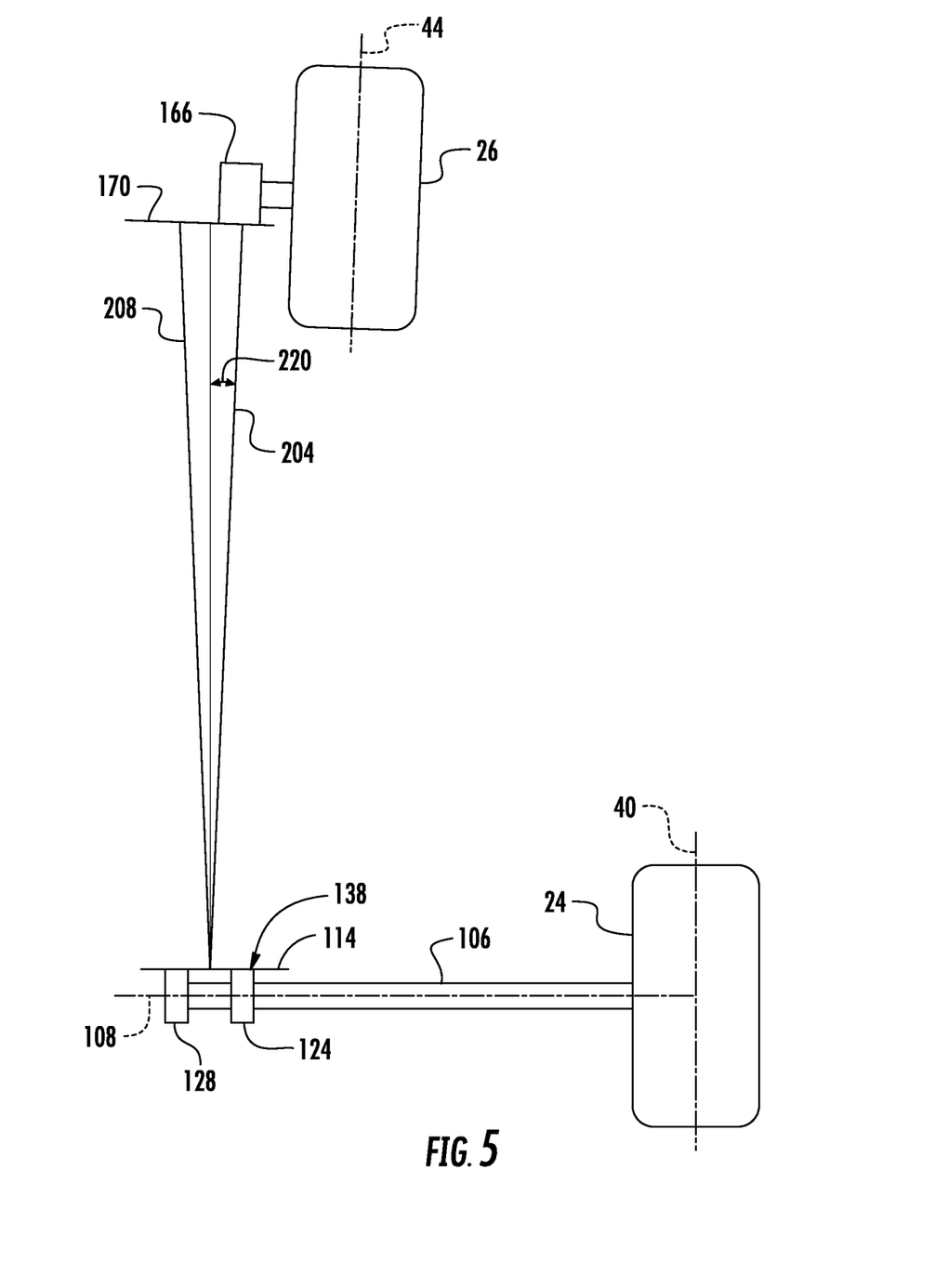
FIG. 5 is a schematic top view of the wheel alignment system attached to a front wheel and a rear wheel of the vehicle.

The laser emitting assembly 150 further includes a laser emitter 166 supported by the connecting rod portion 162. A plate 170 is attached to the laser emitter 166 via, for example, fasteners 174. The plate 170 defines a central opening 178 and includes scale indicia 182. The laser emitter 166 is configured to emit a laser light 204 through the opening 178 in a direction toward the mirror 114 of mirror assembly 112 as depicted in FIG. 5. The laser emitter 166 is calibrated such that the laser light 204 travels parallel to the vertical plane 44 of the wheel 26.

In the embodiment illustrated in FIGS. 3 and 4, the indicia 182 include various markings representing 1/16 degree increments of the toe alignment of the wheel 26. In other embodiments, the scale indicia may be a measurement scale, for example in fractions of an inch or in millimeters, which the user uses to calculate the toe measurement based on known parameters of the vehicle, for example the wheelbase. In yet another embodiment, the indicia 182 include one or more target points, areas, lines, or a combination of points, areas, and lines that the technician uses as a reference to adjust the wheel toe.

To align the toe of the wheels 26, 28, the user mounts the reflecting assembly 104 to the rear wheel 24, and mounts the laser emitting assemblies 150, 190 to the front wheels 26, 28, respectively. The reflecting assembly 104 is attached by extending the bar 106 through the central opening in the hub 30 of the rear wheel 24. The bar 106 is centered in the hub 30 by, for example, wedging a cone (not shown) into the opening in the hub 30. The user then adjusts the adjusting cone 110 such that the mirrors 114, 118 of the first and second mirror assemblies 112, 116, respectively, are positioned slightly outside the vertical plane of the front wheels 26, 28, respectively.

To install the laser emitting assembly 150, the wheel hub adapter 154 is mounted on the hub 32 by removing the lug nuts and placing the wheel hub adapter 154 such that the lug studs extend through holes in the adapter 154. Threaded members are then threaded onto the lug studs to fixedly clamp the wheel hub adapter 154 to the wheel hub 32.

The laser emitting assembly 150 is installed on the front wheel 26 by inserting the connecting rod portion 162 into the cylindrical portion 158 of the wheel hub adapter 154. The user then activates the laser emitter 166 and directs the laser emitter 166 toward the mirror 114. Upon aligning the laser light 204 such that it is pointed at the mirror 114, the user clamps the laser emitting assembly 150 in a fixed position by tightening a set screw or thumb screw (not shown) in the cylindrical portion 158 of the adapter 154, which clamps the connecting rod 162 in place.

The user then loosens the thumbscrews 132 (FIG. 2) of the mirror assembly 112 and pivots the mirror 114 about the central axis 108 of the rod 106 until the laser light 208 reflected from the mirror is directed toward the scale indicia 182 on the plate 170 of the laser emitting assembly 150. The user then tightens the thumbscrews 132 to clamp the holding plate 120 to the rod 106, thereby retaining the mirror 114 in the fixed position. Substantially the same procedure is followed to install the laser emitting assembly 190 onto the wheel 28.

FIG. 5 shows the front wheel 26 at an exaggerated toe angle to more clearly illustrate the operation of the wheel alignment system 100. The laser light 204 is emitted from the laser emitter 166 through the opening 178 along a plane that is parallel to the central plane 44 of the wheel. The laser light 204 reflects from the mirror 114 back toward the laser emitting assembly 150. The reflected laser light 208 illuminates a position on the plate 170.

As illustrated in FIG. 5, the laser light 204, reflected laser 208, and the distance on the plate 170 between the opening 178 and the reflected laser 208 form a triangle. The distance between the wheels 24, 26 is the vehicle wheelbase, which is known based on the type of the vehicle. Thus, the distance between the mirror 114 and the plate 170 is approximately known based on the wheelbase and the distance, along the vehicle direction of travel, that the mirror 114 and plate 170 are offset from the center of the wheels 24 and 26, respectively. While the toe angle of the wheel 26 will slightly increase the distance traveled by the reflected laser 208 due to the laser and plate being mounted a distance from the wheel 26, the amount by which the distance is increased is so small as to be negligible.

It is therefore assumed that the triangle formed by the laser lights 204, 208 and the distance on the plate 170 between the opening 178 and the reflected laser 208 is an isosceles triangle. The angle of the triangle at the mirror 114 can be calculated from the estimated length between the mirror 114 and the plate 170 and the distance on the plate 170 between the opening 178 and the reflected laser 208 using the Pythagorean Theorem. The toe angle of the front wheel 26 (shown by the reference numeral 220), using the plane 40 of the rear wheel 24 as the reference plane, is equal to half of the calculated angle of the triangle.

In the illustrated embodiment, the scale indicia 182 on the plate 170 are measured in degrees. As such, the plate 170 is customized for a particular vehicle with a known wheelbase, and the user need not perform any calculations to determine the toe angle of the front wheel 26. In alternative embodiments in which the scale indicia 182 represent distances, the user would perform the calculations or look up the corresponding toe angle from a table based on the distance and the vehicle wheelbase.

Once the toe angle of the wheel 26 is calculated, the user may adjust the wheel 26 until the toe angle is at a desired angle. The user modifies the angle of the wheel 26 by adjusting the suspension assembly 34 supporting the wheel 26 until the reflected laser 208 strikes the scale indicia 182 at the point corresponding to the desired toe angle. In the illustrated embodiment, the manufacturer's published toe angle is 0.25 degrees, meaning that the desired toe angle of each individual wheel 26, 28 is 0.125 degrees, as illustrated in FIG. 4. In embodiments in which the scale indicia 182 are one or more targets, the user need only align the wheel until the reflected laser light 208 is aligned with the desired target.

The reader should appreciate that, while the illustrated embodiment shows the reflected laser light 208 returning to the plate in the same horizontal plane as the laser light 204 is emitted (see FIG. 4), meaning the surface 138 of the mirror 114 is exactly vertical, it is not necessary for the determination of the toe angle that the mirror 114 be exactly vertical. If the mirror 114 is slightly out of the vertical plane, the reflected laser light 208 may still illuminate the plate 170 at a point close enough to the scale indicia 182 to enable a user to accurately determine the toe angle of the wheel.

Once the user has determined the toe angle of the first front wheel 26, the user repeats the procedure described above with the other front wheel 28. In the illustrated embodiment, the wheel alignment assembly 100 is illustrated as having two laser emitting assemblies 150, 190, one for each front wheel 26, 28. The reader should appreciate, however, that, in some embodiments, the laser wheel alignment assembly 100 includes only one laser emitting assembly 150. The single laser emitting assembly 150 is used to align each of the front wheels 26, 28 in sequence.

The wheel alignment system of the present disclosure enables accurate determination of the wheel toe alignments since no manual measurements or positioning of targets is required. Additionally, all three wheels of the vehicle remain on the vehicle during the toe alignment, ensuring accurate ride height position. Moreover, the wheel alignment system is adaptable to various different three-wheeled vehicles by using different indicia and adapter elements to connect to different wheel sizes, lug patterns, or track width changes.

In some embodiments, the wheel alignment system is packaged with camber and caster measuring tools (not shown). The camber and caster measuring tools may be configured with a portion that is inserted into the cylindrical projecting portion 158 of the wheel hub adapter 154 so as to orient the camber and caster measuring tools on the central axis of the wheel 26, 28. In some embodiments, the camber and caster is measured with a single tool. In other embodiments, the camber and/or caster measurement may be integrated on the laser emitting assemblies 150, 190.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A wheel alignment system for a three-wheeled vehicle, comprising:
    a reflecting assembly including a first mirror having a first reflective surface arranged in a first mirror plane that is perpendicular to a rear wheel vertical plane, which is defined centrally through a rear wheel along a direction of travel of the vehicle;
    a first laser emitting assembly including (i) a first laser emitter configured to emit a first laser light at the reflective surface along a laser line parallel to a first front wheel vertical plane, which is defined centrally through a first front wheel, and (ii) first indicia corresponding to a toe angle of the first front wheel,
    wherein the first mirror reflects the first laser light toward the first indicia,
    wherein the reflecting assembly includes a bar having a bar central axis, the bar mounted such that the bar central axis is normal to the rear wheel vertical plane and parallel to the first mirror plane, the bar supporting the first mirror in the first mirror plane, and
    wherein the reflecting assembly includes a second mirror supported by the bar, the second mirror including a second reflective surface arranged in a second mirror plane that is perpendicular to the rear wheel vertical plane.

2. The wheel alignment system of claim 1, wherein the first laser emitting assembly includes a plate on which the first indicia are marked, the plate being arranged normal to the first laser line and defining an opening through which the first laser light passes.

3. The wheel alignment system of claim 2, further comprising a wheel hub adapter configured to attach to the first front wheel and support the first laser emitting assembly.

4. The wheel alignment system of claim 1, wherein:
    the wheel alignment system further comprises a second laser emitting assembly including (i) a second laser emitter configured to emit a second laser light at the second reflective surface along a second laser line parallel to a second front wheel vertical plane, which is defined centrally through a second front wheel, and (ii) second indicia corresponding to a second toe angle of the second front wheel; and
    the second mirror reflects the second laser light toward the second indicia.

5. The wheel alignment system of claim 4, wherein the bar extends through and is supported by a central opening of a hub of the rear wheel.

6. The wheel alignment system of claim 1, wherein the first indicia include markings corresponding to the toe angle of the first front wheel in degrees.

7. The wheel alignment system of claim 1, wherein the first indicia include distance measurements that are converted to the toe angle of the first front wheel.

8. A method of determining toe angle of wheels of a three-wheeled vehicle, comprising:
    mounting a reflecting assembly to a rear wheel of the vehicle in such a way that a first reflective surface of a first mirror of the reflecting assembly is arranged in a first mirror plane that is perpendicular to a rear wheel vertical plane, which is defined centrally through a rear wheel along a direction of travel of the vehicle;

mounting a first laser emitting assembly to a first front wheel of the vehicle such that a first laser emitter of the first laser emitting assembly is directed at the first reflective surface;

emitting a first laser light at the first reflective surface along a first laser line that is parallel to a first front wheel vertical plane, which is defined centrally through a first front wheel;

reflecting the first laser light from the first reflective surface toward first indicia of the first laser emitting assembly; and determining a toe angle of the first front wheel based on a position of the first laser light with reference to the first indicia the mounting of the reflecting assembly comprising:

mounting a bar such that a bar central axis is normal to the rear wheel vertical plane; parallel to the first mirror plane;

supporting the first mirror in the first mirror plane with the bar;

the mounting of the reflecting assembly further comprising mounting a bar such that a bar central axis is normal to the rear wheel vertical plane and parallel to the first mirror plane, and supporting the first mirror in the first mirror plane with the bar;

the mounting of the reflecting assembly including aligning a second reflective surface of a second mirror of the reflecting assembly in a second mirror plane that is perpendicular to the rear wheel vertical plane;

mounting a second laser emitting assembly to a second front wheel of the vehicle in such a way that a second laser emitter of the second laser emitting assembly is directed at the second mirror;

emitting a second laser light at the second reflective surface along a second laser line that is parallel to a second front wheel vertical plane, which is defined centrally through a second front wheel;

reflecting the second laser light from the second reflective surface toward second indicia of the second laser emitting assembly; and determining a toe angle of the second front wheel based on a position of the second laser light with reference to the second indicia.

9. The method of claim 8, wherein:

the emitting of the first laser light includes emitting the first laser light through an opening in a plate, which is arranged normal to the first laser line; and the reflecting of the first laser light includes reflecting the laser light onto the plate, on which the first indicia are marked.

10. The method of claim 9, wherein the mounting of the first laser emitting assembly comprises:

mounting a wheel hub adapter on the first front wheel; and supporting the first laser emitting assembly with the wheel hub adapter.

11. The method of claim 8, wherein the mounting of the bar includes supporting the bar through a central opening of a hub of the rear wheel bar.

12. The method of claim 11, further comprising:

adjusting the first toe angle of the first front wheel based on the position of the first laser light with reference to the first indicia.

13. The method of claim 8, wherein the first indicia include degree measurements corresponding to the toe angle of the first front wheel.

14. The method of claim 8, wherein the first indicia include distance measurements that are converted to the toe angle of the first front wheel.

15. A method of aligning wheels of a three-wheeled vehicle, comprising:

mounting a reflecting assembly to a rear wheel of the vehicle in such a way that a first reflective surface of a first mirror of the reflecting assembly is arranged in a first mirror plane that is perpendicular to a rear wheel vertical plane, which is defined centrally through a rear wheel along a direction of travel of the vehicle;

mounting a first laser emitting assembly to a first front wheel of the vehicle such that a first laser emitter of the laser first emitting assembly is directed at the first mirror;

emitting a first laser light at the first reflective surface along a first laser line parallel to a first front wheel vertical plane, which is defined centrally through the first front wheel;

reflecting the first laser light from the first reflective surface toward first indicia of the first laser emitting assembly; and adjusting a first toe angle of the first front wheel based on a first position of the first laser light with reference to the first indicia;

the mounting of the reflecting assembly further comprising mounting a bar such that a bar central axis is normal to the rear wheel vertical plane and parallel to the first mirror plane, and supporting the first mirror in the first mirror plane with the bar;

the mounting of the reflecting assembly including aligning a second reflective surface of a second mirror of the reflecting assembly in a second mirror plane that is perpendicular to the rear wheel vertical plane;

mounting a second laser emitting assembly to a second front wheel of the vehicle in such a way that a second laser emitter of the second laser emitting assembly is directed at the second mirror;

emitting a second laser light at the second reflective surface along a second laser line that is parallel to a second front wheel vertical plane, which is defined centrally through a second front wheel;

reflecting the second laser light from the second reflective surface toward second indicia of the second laser emitting assembly; and determining a toe angle of the second front wheel based on a position of the second laser light with reference to the second indicia.

16. The method of claim 15, wherein the first and second indicia include a target markings.

* * * * *

UNITED STATES PATENT AND TRADEMARK OFFICE
CERTIFICATE OF CORRECTION

| | |
|---|---|
| PATENT NO. | : 9,821,849 B2 |
| APPLICATION NO. | : 14/959127 |
| DATED | : November 21, 2017 |
| INVENTOR(S) | : Andrew Prusinowski |

It is certified that error appears in the above-identified patent and that said Letters Patent is hereby corrected as shown below:

1: In Column 9, Lines 15-18, Lines 23-26 of Claim 8 should be corrected as follows:

the mounting of the reflecting assembly comprising:
        mounting a bar such that a bar central axis is normal to the
            rear wheel vertical plane and parallel to the first mirror
        plane;

2: In Column 10, Lines 56-57, Claim 16 should be corrected as follows:

16. The method of claim 15, wherein the first and second
indicia include target markings.

Signed and Sealed this
Sixth Day of March, 2018

Andrei Iancu
*Director of the United States Patent and Trademark Office*